United States Patent
Rocchi

(10) Patent No.: US 9,134,128 B2
(45) Date of Patent: Sep. 15, 2015

(54) METHOD FOR DETECTING ACCELERATIONS AND ROTATION RATES, AND MEMS SENSOR

(75) Inventor: Alessandro Rocchi, Rosignano Solvay (LI) (IT)

(73) Assignee: Maxim Integrated Products, Inc., San Jose, CA (US)

( * ) Notice: Subject to any disclaimer, the term of this patent is extended or adjusted under 35 U.S.C. 154(b) by 614 days.

(21) Appl. No.: 13/258,153

(22) PCT Filed: Feb. 22, 2010

(86) PCT No.: PCT/EP2010/052202
§ 371 (c)(1),
(2), (4) Date: Sep. 21, 2011

(87) PCT Pub. No.: WO2010/112268
PCT Pub. Date: Oct. 7, 2010

(65) Prior Publication Data
US 2012/0017678 A1    Jan. 26, 2012

(30) Foreign Application Priority Data
Mar. 31, 2009  (DE) .......................... 10 2009 002 066

(51) Int. Cl.
*G01C 19/5747*   (2012.01)
*G01C 19/5762*   (2012.01)
(Continued)

(52) U.S. Cl.
CPC ........ *G01C 19/5747* (2013.01); *G01C 19/5762* (2013.01); *G01P 15/097* (2013.01); *G01P 15/14* (2013.01); *G01P 15/18* (2013.01)

(58) Field of Classification Search
CPC ............ G01C 19/5747; G01C 19/5762; G01P 15/097; G01P 15/18
USPC ............... 73/504.12, 504.04, 504.14, 514.32, 73/514.36, 514.38, 510, 511
See application file for complete search history.

(56) References Cited

U.S. PATENT DOCUMENTS 5,955,668 A * 9/1999 Hsu et al. .................... 73/504.12
6,370,937 B2 * 4/2002 Hsu ................................ 73/1.37
(Continued)

FOREIGN PATENT DOCUMENTS

DE    10 2007 017 209 A1    9/2008
DE       102007017209 A1    10/2008
(Continued)

OTHER PUBLICATIONS

International Search Report for Co-Pending PCT Application No. PCT/EP2010/052202.
(Continued)

*Primary Examiner* — Helen Kwok
(74) *Attorney, Agent, or Firm* — North Weber & Baugh LLP

(57) ABSTRACT

The invention concerns a MEMS sensor and a method for detecting accelerations along, and rotation rates about, at least one, preferably two of three mutually perpendicular spatial axes x, y and z by means of a MEMS sensor (1), wherein at least one driving mass (6; 6.1, 6.2) and at least one sensor mass (5) are moveably arranged on a substrate (2) and the at least one driving mass (6; 6.1, 6.2) is moved relative to the at least one sensor mass (5) in oscillation at a driving frequency and when an external acceleration of the sensor occurs, driving mass/es (6; 6.1, 6.2) and sensor mass/es (5) are deflected at an acceleration frequency and, when an external rotation rate of the sensor (1) occurs, are deflected at a rotation rate frequency, and the acceleration frequency and rotation rate frequency are different. At the MEMS-sensor the driving mass/es (6; 6.1, 6.2) and sensor mass/es (5) are arranged on the substrate (2), and are balanced in the resting state by means of at least one of the anchors (3). In the driving mode the driving mass/es (6; 6.1, 6.2), when vibrating in oscillation about this at least one anchor (3), generate/s an imbalance of the driving mass/es (6; 6.1, 6.2) and the sensor mass/es (5) with respect to this at least one anchor (3), and the sensor elements detect deflections of the driving and sensor masses, due to torques and Coholis forces generated, with an acceleration frequency and/or a rotation rate frequency.

19 Claims, 6 Drawing Sheets

Figure 1:
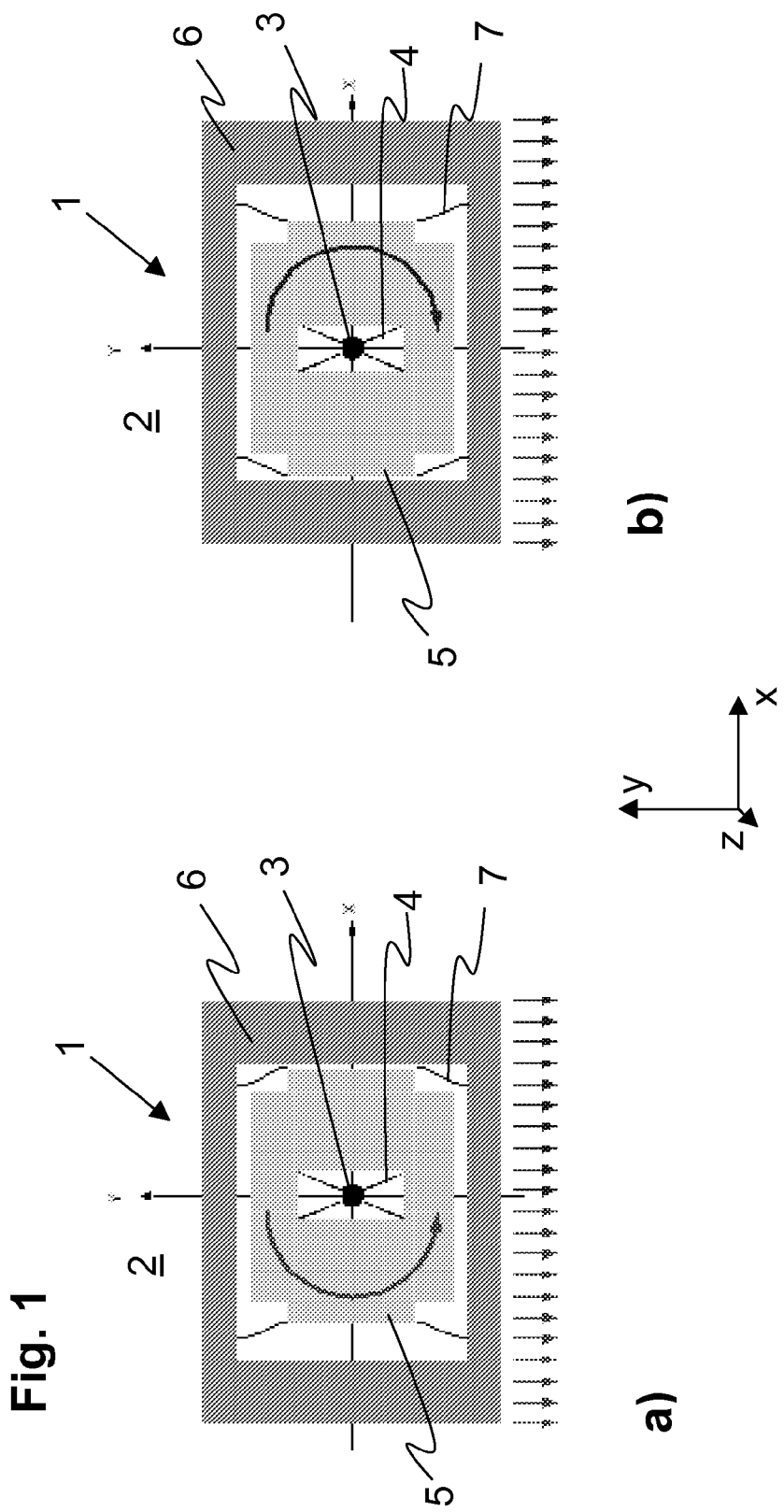

(51) Int. Cl.
*G01P 15/097* (2006.01)
*G01P 15/18* (2013.01)
*G01P 15/14* (2013.01)

(56) References Cited

U.S. PATENT DOCUMENTS

| | | | |
|---|---|---|---|
| 6,715,352 B2* | 4/2004 | Tracy | 73/504.02 |
| 6,725,719 B2* | 4/2004 | Cardarelli | 73/504.04 |
| 7,281,406 B2* | 10/2007 | Mase | 73/1.37 |
| 7,340,954 B2* | 3/2008 | Handrich | 73/504.04 |
| 7,520,169 B2* | 4/2009 | Schwarzelbach | 73/504.12 |
| 7,757,555 B2* | 7/2010 | Pan et al. | 73/514.24 |
| 7,950,281 B2* | 5/2011 | Hammerschmidt | 73/504.04 |
| 7,980,134 B2* | 7/2011 | Hammerschmidt | 73/504.12 |
| 8,322,212 B2* | 12/2012 | Rocchi | 73/504.12 |
| 8,429,970 B2* | 4/2013 | Rocchi | 73/504.08 |
| 8,584,522 B2* | 11/2013 | Acar et al. | 73/504.12 |
| 8,789,416 B2* | 7/2014 | Rocchi | 73/504.12 |
| 2001/0039834 A1* | 11/2001 | Hsu | 73/504.02 |
| 2002/0134154 A1* | 9/2002 | Hsu et al. | 73/504.04 |
| 2002/0189351 A1* | 12/2002 | Reeds et al. | 73/504.04 |
| 2002/0189352 A1* | 12/2002 | Reeds et al. | 73/504.04 |
| 2003/0196490 A1 | 10/2003 | Cardarelli | |
| 2005/0217375 A1 | 10/2005 | Mase | |
| 2007/0214883 A1* | 9/2007 | Durante et al. | 73/504.04 |
| 2007/0220973 A1* | 9/2007 | Acar | 73/504.12 |
| 2008/0053228 A1 | 3/2008 | Pan | |
| 2008/0276706 A1* | 11/2008 | Hartmann et al. | 73/504.04 |

FOREIGN PATENT DOCUMENTS

| | | |
|---|---|---|
| JP | H05-248872 | 9/1993 |
| JP | 2000-509812 | 2/2000 |
| JP | 2007-155489 | 6/2007 |
| JP | 2007-333643 | 12/2007 |

OTHER PUBLICATIONS

Office Action dated Dec. 11, 2013, in corresponding Japanese Patent Application No. 2012-502529.
Office Action of Nov. 26, 2013, in related Chinese Patent Application No. 201080014830.X.

\* cited by examiner

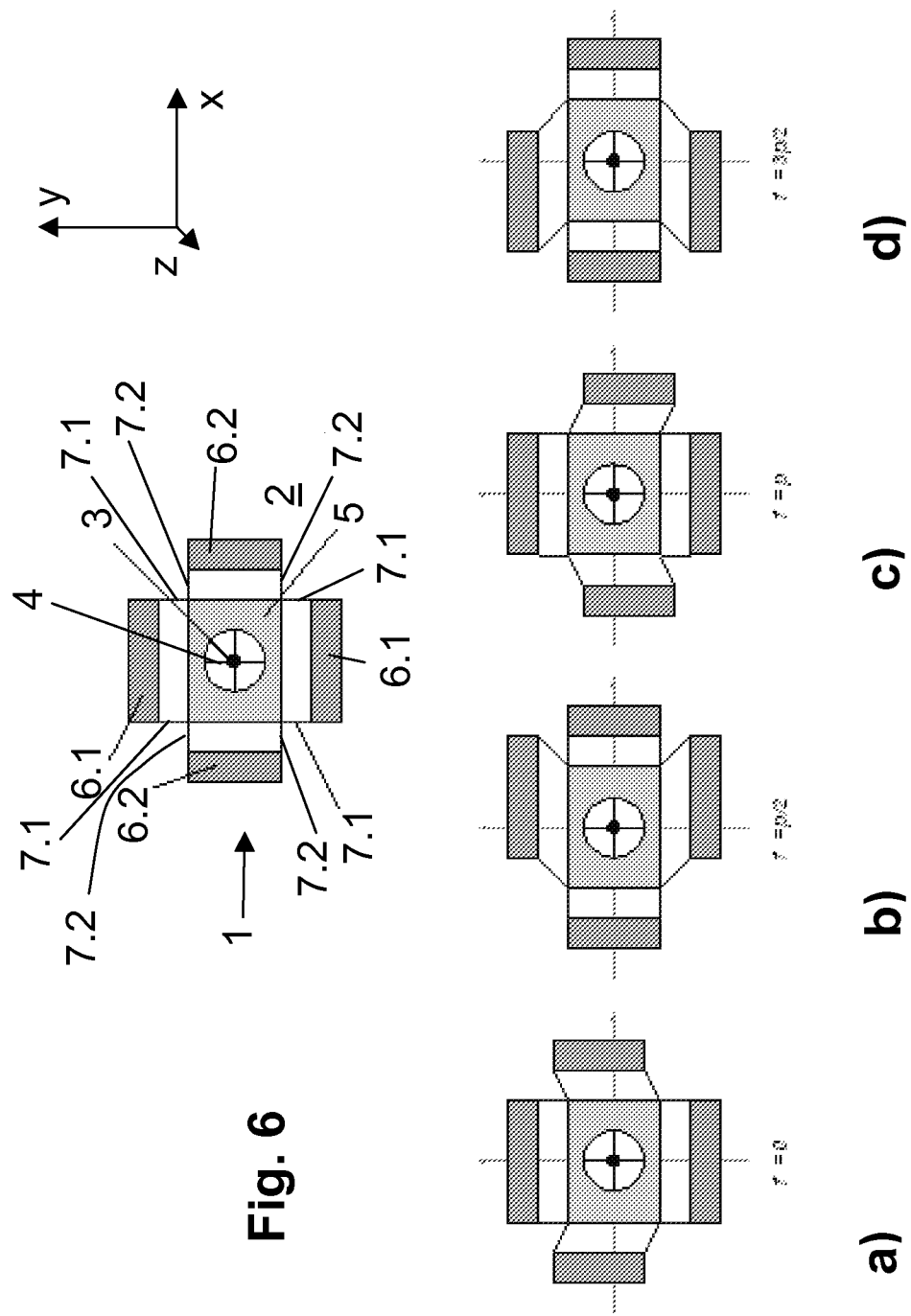

METHOD FOR DETECTING ACCELERATIONS AND ROTATION RATES, AND MEMS SENSOR

The present invention relates to a method for detecting accelerations along, and rates of rotation about, at least one, preferably two of three mutually perpendicular spatial axes x, y and z by means of a MEMS sensor, wherein at least one driving mass and at least one sensing mass are moveably arranged on a substrate, and the driving mass is moved at a driving frequency in an oscillating manner relative to the sensing mass, and also to a corresponding MEMS sensor with a substrate, with at least one driving mass which is arranged moveably and in oscillation parallel to the plane of the substrate in an x-y plane, with at least one sensing mass, with connection springs for connecting the at least one driving mass to the at least one sensing mass, and with at least one anchor and one anchor spring for connecting the at least one driving mass and/or the at least one sensing mass to the substrate, with drive elements for driving the driving mass/es in oscillation at a driving frequency relative to the sensing mass/es in order to subject them to Coriolis forces during a rotation of the substrate about an arbitrary spatial axis, and with sensing elements for detecting the accelerations and rotational movements of the substrate.

MEMS sensors are known for example as micro-gyroscopes, which are used for determining rotational movements about one or more axes in an orthogonal x-y-z-coordinate system. In order to be able to detect rotational movements of the system about each of the three axes, in the simplest case three micro-gyroscopes are necessary, each of which determines the rotational movement about a single axis. More expensive micro-gyroscopes are constructed in such a way that they can detect rotational movements about multiple axes. Basically, these gyroscopes work according to the principle that during a rotational movement of the entire system about an axis perpendicular to the driving motion, an oscillating driving mass generates a Coriolis force in the third axial direction. Given an appropriate mounting of the driving mass, this Coriolis force causes a deflection of the driving mass and, where applicable, of a sensing mass coupled to it. To the sensing mass in particular, sensing elements are assigned, which are normally plate capacitors or comb electrodes, which when their separation changes generate an electrical signal which is proportional to the rotational movement. The corresponding rotational movement can be detected by means of this electrical signal. A micro-gyroscope of this kind for three axes is known, for example, from TW 286201 BB.

US 2008/0053228 A1 discloses a sensor for detecting accelerations which can occur in three spatial axes. In this arrangement a sensing mass is moveably suspended in the space, and is deflected accordingly when accelerations of the sensor occur in one of the spatial axes. The deflection that occurred is determined in turn, by means of electrodes or by a deformation of the springs on which the sensing elements are suspended, and converted into an electrical signal.

A disadvantage of the sensors of the prior art is that to detect accelerations and rotational movements of the sensor, either different specialized sensors must be used, which only give information about the movements of the entire sensor unit in combination, or that very complicated sensors are necessary, which are difficult to manufacture and can be correspondingly vulnerable in operation. Also common to all these solutions is the fact that they are very cost intensive in their manufacture.

The problem addressed by the present invention therefore, is to create a sensor for detecting accelerations and rotational movements, which is relatively simple in construction and inexpensive to manufacture, and moreover has a high detection accuracy.

The problem is solved by a method and a MEMS sensor with the features of the independent claims.

The method according to the invention serves to detect accelerations along and rates of rotation about one, preferably two, of three mutually perpendicular spatial axes x, y and z by means of a MEMS sensor. At least one driving mass and at least one sensing mass are moveably arranged on a substrate. The at least one driving mass is moved in oscillation at a driving frequency relative to the at least one sensing mass. Driving mass/es and sensing mass/es are deflected in the event of an external acceleration of the sensor at an acceleration frequency and in the event of an external rotation rate of the sensor at a rotation rate frequency. The acceleration frequency and rotation rate frequency are different, which means that the acceleration frequency or rotation rate frequency occurring in response to an acceleration or rotation rate can be kept distinct, and therefore conclusions can be drawn as to the acceleration or rotation rate that has taken place. Due to the method according to the invention, it is possible that the same sensing elements can be used both for the acceleration and for the rotation rate of the sensor. The distinction is made as to whether the sensor was exposed to an acceleration or to a rotation solely by means of the frequency that occurred.

In an advantageous embodiment the method according to the invention can also be used for detecting a third acceleration direction and a third rotation rate. For this purpose, at least one additional driving mass is provided which is moved in oscillation in a direction orthogonal to the at least one driving mass of the first two directions or rotation rates and relative to at least one sensing mass. This enables a sensor to be created, which can detect three acceleration directions as well as three rotation rate directions. Only a small number of moving parts are necessary. The production of the device is thereby simplified quite considerably and the manufacturing costs are kept relatively low.

It is particularly advantageous if, in the event of an external acceleration of the sensor, the driving mass/es and the sensing mass/es are deflected at an acceleration frequency which is equal to the driving frequency, and in the event of an external rotation rate of the sensor, they are deflected at a rotation rate frequency which is double the driving frequency. This provides a clear distinction between acceleration and rotation rate, which means that it is simple to determine whether the sensor is being accelerated or rotated.

Preferably, driving mass/es and sensing mass/es are deflected due to a torque when the sensor is accelerated. The torque arises, for example, due to the fact that the driving mass/es is/are arranged eccentrically on the substrate with respect to the mounting of driving and/or sensing mass/es. The oscillating driving mass/es, which eccentrically project/s over the balanced central position alternately on one side and the other side, create torques during an acceleration that are transverse to this driving motion and which, given an appropriate mounting of the driving mass and sensing mass on the substrate, generate a rotational movement of these masses. This rotational motion is also oscillating, like the driving motion of the driving mass/es, which means that an oscillating rotational motion of the driving mass/es and sensing mass/es arises. This oscillating rotational movement, due to the torque of the repeatedly asymmetrically arranged driving mass/es, can be detected by means of sensing elements.

To detect the rotation of the sensor, driving mass/es and sensing mass/es are advantageously deflected due to a torque and a Coriolis force. The Coriolis force arises due to the driving frequency of the driving mass/es perpendicular to the acceleration and driving direction. If the driving mass is arranged and mounted in such a way that during its oscillating driving motion it repeatedly projects asymmetrically over the mounting of the driving mass/es and sensing mass/es, then a torque additionally occurs, which is superimposed on the Coriolis force. In this case a typical rotation rate frequency occurs which differs from the driving frequency and also from the pure acceleration frequency. Due to this, the associated sensing elements generate a typical signal, which indicates the rotation of the sensor. The deflection generated here is also, like the driving frequency, oscillating.

Acceleration frequency and rotation rate frequency are advantageously proportional to the acceleration and rotation rate produced, and can be measured and evaluated accordingly.

A MEMS sensor according to the invention is used to determine accelerations along and rotational movements about at least one, preferably two of three mutually perpendicular spatial axes x, y and z. The MEMS sensor has a substrate and at least one driving mass, which is arranged moveably and in oscillation parallel to the plane of the substrate in an x-y plane. At least one sensing mass is connected with connecting springs to the at least one driving mass. The driving mass/es and/or the sensing mass/es are connected to the substrate with at least one anchor and one anchor spring. In addition, the MEMS sensor has driving elements for driving the driving mass/es in oscillation at a driving frequency relative to the sensing mass, in order to subject them to Coriolis forces when a rotation of the substrate occurs about an arbitrary spatial axis. Sensing elements are used for detecting the acceleration and rotational movements of the substrate. According to the invention, in the resting state of the sensor the driving mass/es and the sensing mass/es are arranged on the substrate, balanced by means of at least one of the anchors. In the driving mode the driving mass/es vibrate in oscillation about this at least one anchor and thus alternately generate an imbalance towards one side or the other. The driving mass/es are then alternately on one side and the other side of the centre of gravity of the sensor in the resting state, and thus alternately generate an imbalance on one side and the other side of the anchor, or centre of gravity, respectively. The sensing elements detect the deflections of the driving and sensing masses due to the torques generated and/or Coriolis forces with an acceleration frequency and/or a rotation rate frequency.

Due to the oscillation of the driving mass/es about an equilibrium state according to the invention, the driving and sensing masses to be deflected are alternately increased and reduced respectively on one side and the other. This causes different mass distributions to occur, which in the event of a linear acceleration of the sensor, generate torques about the anchor point or anchor points of the driving mass/es and the sensing mass/es on the substrate. Given an appropriate mounting of the driving mass/es, or the sensing mass/es, these torques deflect the mass/es on the substrate around the anchor point and cause a rotation of the two masses about the anchor. This moving oscillatory torque generates a unique signal, which indicates the corresponding acceleration. By means of the first driving mass/es, which is/are driven in oscillation in the x-direction, when an acceleration occurs in the y-direction, torques are thereby generated about the z-axis. If the sensor by contrast is accelerated in the z-direction, then an oscillating torque is produced, which generates a tilting motion of the driving and sensing mass/es about the y-axis. It should be noted here that the driving or sensing mass respectively is suspended on the substrate using anchor springs, which allow these movements. The anchor spring must therefore be constructed in such a way that it allows a rotation about the z-axis for the detection of an acceleration in the y-direction, while for indicating a z-acceleration it must allow pivoting of the sensing mass/es and driving mass/es about the y-axis. The connection springs for connecting the driving mass to the sensing mass, on the other hand, should be configured such that they are only elastic in the driving direction, or have a controlled compliance. In the other axial directions, by contrast, they are designed to be stiff, so that the driving mass/es and sensing mass/es in these directions are essentially rigidly coupled to one another.

If the sensor is rotated about the z-axis, then a Coriolis force arises, which, under the combined influence of the torques due to the oscillating asymmetric mass distribution causes a rotation of the driving and sensing masses about the z-axis. In the case of a rotation of the sensor about the y-axis, a corresponding rotation occurs about the y-axis. Both rotations occur at a typical rotation rate frequency, which is different from the rotation frequency induced by a linear acceleration and which can be detected and evaluated.

The at least one driving mass can be preferably linearly driven in oscillation along one of the three spatial axes. For the drive, driving electrodes, in particular comb electrodes, are used in a customary way, which alternatingly attract the driving mass/es in turn. The at least one driving mass thereby preferably moves in such a way that starting from an end position it is accelerated up to a central position and then decelerated back again to the other end position. Subsequently, the driving direction is reversed and the driving mass is again accelerated up to the central position and decelerated once again.

In a particularly advantageous embodiment of the invention the sensor is designed to detect a third acceleration direction and a third rotation rate. For this purpose the sensor has at least one additional driving mass, which can be driven with driving elements in oscillation in a direction that is orthogonal to the first driving direction. This at least one second driving mass therefore moves at right angles to the first driving mass/es, which is/are responsible for the first two directions or rotation rates, respectively. The at least one second driving mass, moreover, moves relative to at least one sensing mass, which reacts to the corresponding forces. This sensing mass can advantageously be identical to the sensing mass for the first two directions or rotation rates, respectively. In this case it must be fixed to the anchor in such a way that it allows appropriate reactions, which means oscillating rotational movements about the x and the z-axis. The second driving mass in this case preferably moves in the y direction. When an acceleration of the sensor occurs in the x-direction the second driving mass with the sensing mass reacts by rotation about the z-axis. If a rotation rate about the x-axis occurs, then the second mass pivots about the x-axis. The reaction to an acceleration or a rotation rate in each case takes place by means of oscillating movements of the second driving mass together with the sensing mass at frequencies which differ from one another. Preferably, the rotation frequencies for accelerations in all axes are equal to the driving frequency of the affected driving masses, while the rotation frequencies for rotations of the sensor are twice as large as the corresponding driving frequencies.

In one advantageous embodiment of the invention, at least one of the anchors, which bears the driving elements or the central elements, is a central anchor. The central anchor can also consist of multiple individual anchor parts, which are arranged close together. The anchor preferably forms the centre of mass in the balanced state of the sensor.

The sensing mass is preferably arranged on the central anchor. This facilitates a particularly simple embodiment of the invention, since only one sensing mass is necessary for a symmetrical construction of the sensor in the resting state.

In one advantageous embodiment of the invention, the at least one sensing mass can be rotated and pivoted about an axis, in particular about the central anchor. For this purpose the sensing mass is fixed using appropriate anchor springs on the central anchor. In this arrangement the anchor springs are implemented in such a way that they allow a rotation and pivoting in the intended direction for the sensing mass/es.

If the at least one driving mass can rotate and pivot about an axis, in particular about the central anchor, then multiple sensing masses can be provided. This certainly means that more space is needed for the sensor, but on the other hand, the detection of the motion of the sensing masses is simpler to implement.

The driving mass/es and the sensing mass/es are preferably connected together with connection springs. These connection springs must be implemented in such a way that, in particular, they allow mobility of the driving masses in the driving direction. The at least one sensing mass itself is arranged on the substrate so that it is immobile in this direction. The sensing mass is accordingly only moved, when a corresponding acceleration or rotation rate occurs and generates a deflection of the driving mass/es, and the sensing mass is rigidly coupled to the driving mass.

In order to detect the motion of the sensing mass/es and/or the driving mass/es as a reaction to an acceleration or rotation rate, sensing elements are assigned to the at least one sensing mass and/or the at least one driving mass, which correspond to sensing elements arranged in a fixed position on the substrate. Suitable devices for this purpose are plate capacitors or fork electrodes, which convert changes in separation into an electrical signal.

In a particularly advantageous embodiment of the sensor, an analysis unit is assigned to the sensor, in order to distinguish between an acceleration frequency and a rotation rate frequency. Because the rotation rate frequency and the acceleration frequency are fundamentally different, due to the corresponding occurrence of such a frequency, a distinction can be made as to whether the sensor is being accelerated in an axial direction or rotated about an axis.

Figure 2:
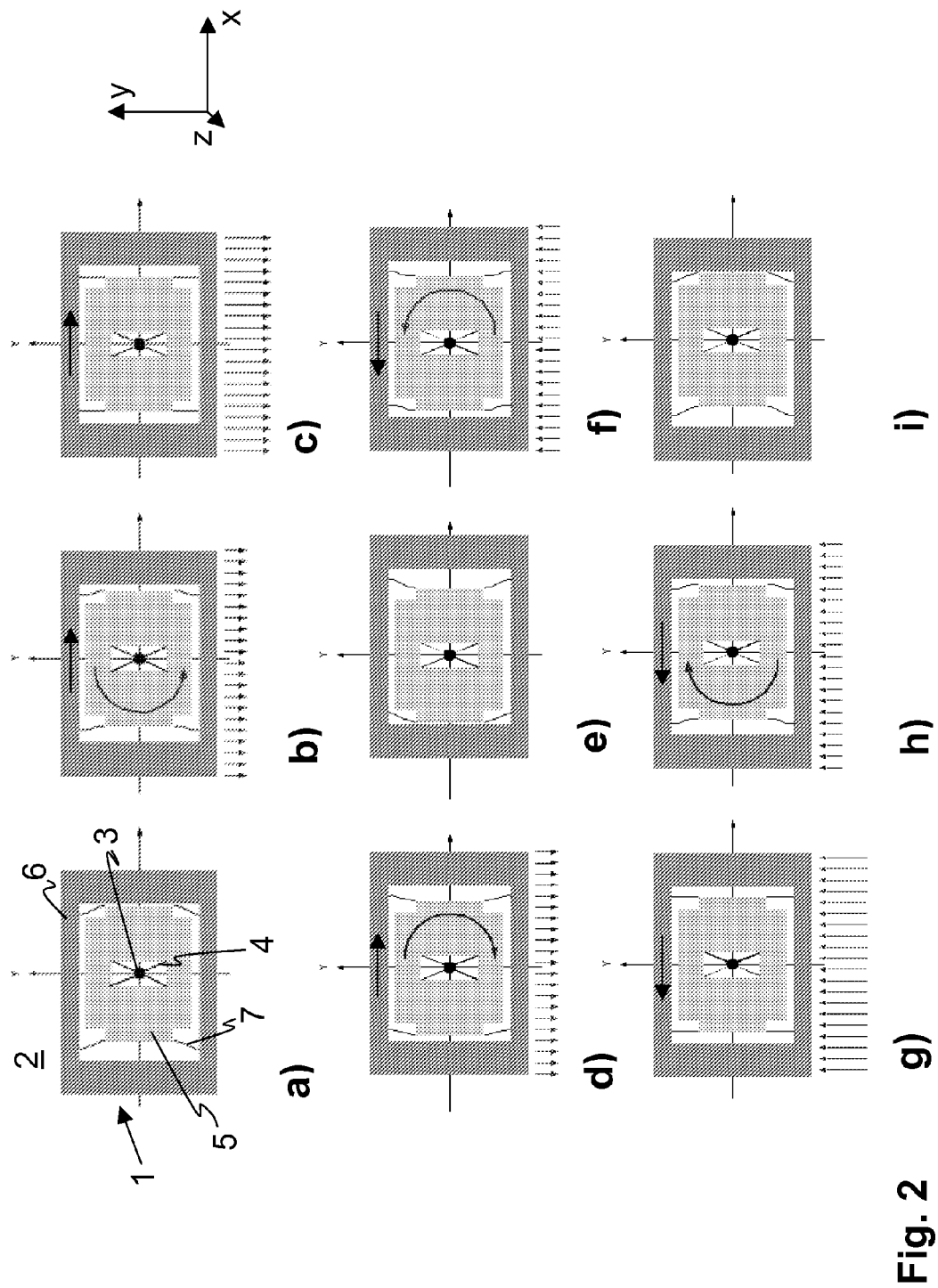
Figure 3:
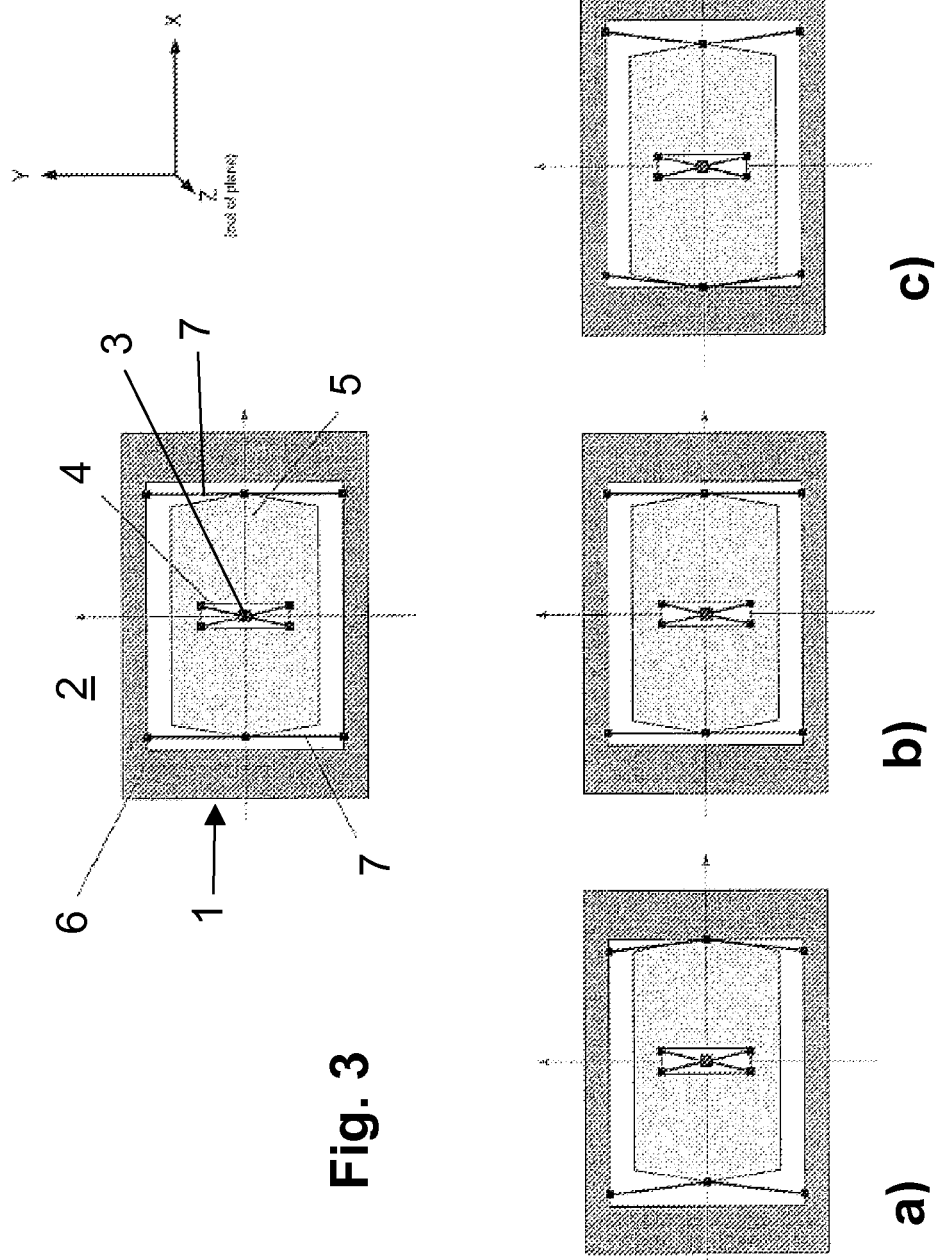
Figure 4:
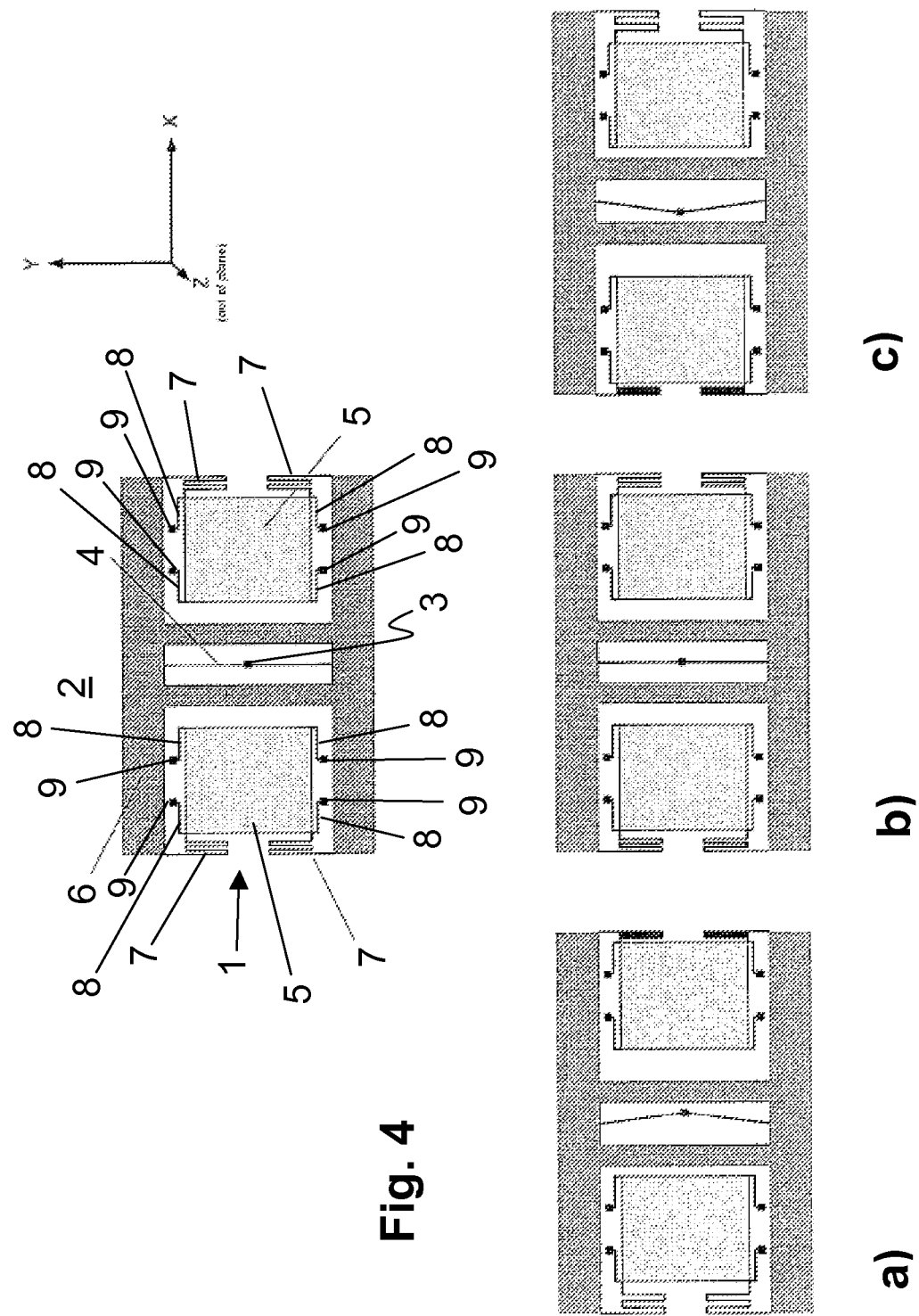
Figure 5:
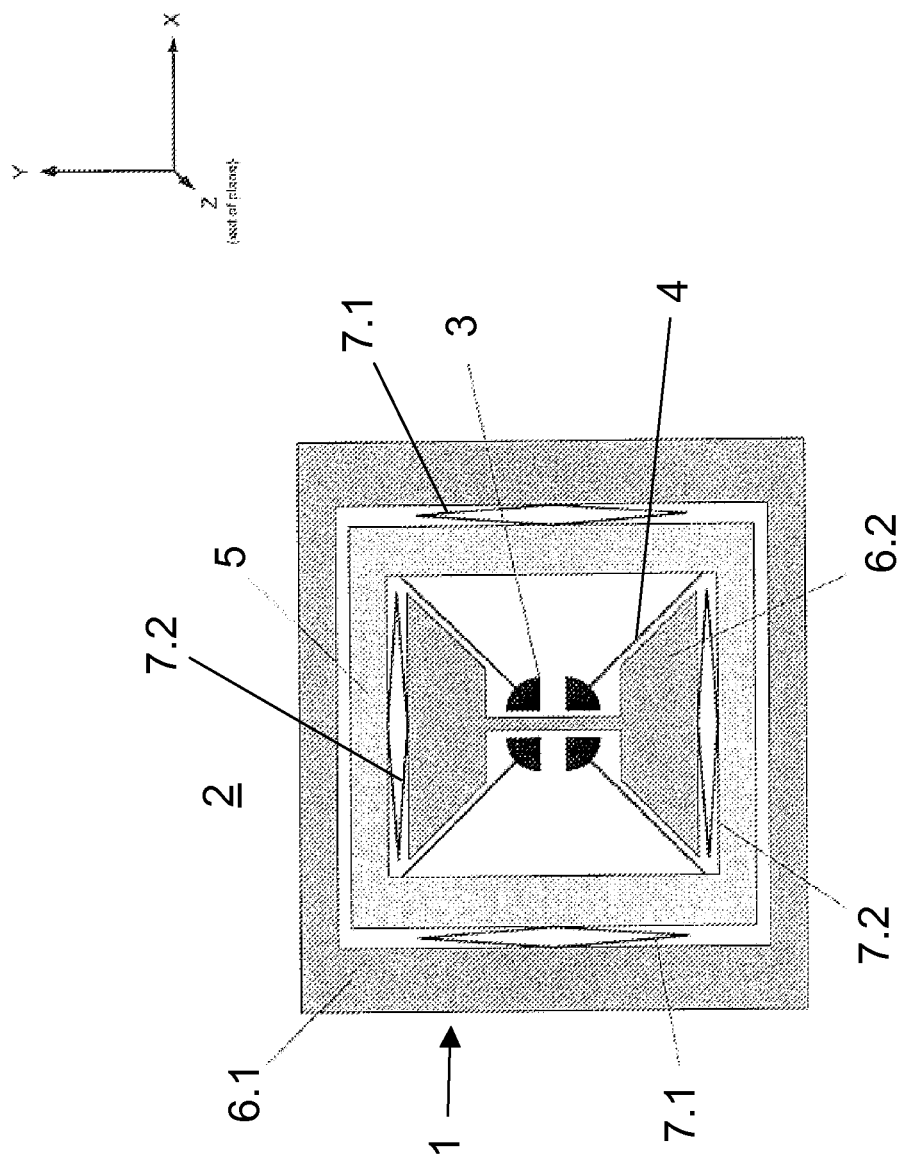

Other advantages of the invention are described in subsequent embodiment examples. These show:

FIG. 1 a sensor according to the invention during an acceleration in the y direction, FIG. 2 a sensor according to the invention during a rotation about the z-axis, FIG. 3 a further sensor according to the invention with one sensor mass, FIG. 4 a sensor according to the invention with two sensing masses, FIG. 5 a sensor according to the invention with two driving masses and FIG. 6 a further sensor according to the invention with four driving masses.

In FIG. 1 a sensor 1 according to the invention is schematically illustrated. The sensor 1 consists of a substrate 2, which is arranged parallel to the plane of the drawing (x-y plane). Arranged on the substrate 2 is an anchor 3, which supports a sensing mass 5 via four anchor springs 4. The anchor springs 4 are arranged in an x-shape on the anchor 3, and due to their corresponding spring stiffnesses in the x, y and z-direction they allow a torsion of the sensing mass 5 about the z-axis, which projects out of the plane of the drawing, and a torsion of the sensing mass 5 about the y-axis. About the x-axis and in the directions of the x, y and z the springs 4 are not compliant.

A driving mass 6 is fixed on the sensing mass 5 by means of four connecting springs 7. The connecting springs 7 have a spring stiffness which is relatively soft in the x direction, in order to allow a movement of the driving mass 6 relative to the sensing mass 5 in the x direction. With regard to a rotation about the y-axis or z-axis however, the connecting springs 7 are stiff, which means a coupling of the driving mass 6 to the sensing mass 5 is effected. If the driving mass 6 is correspondingly deflected, then this deflection is transmitted to the sensing mass 5, which, owing to its mounting via the anchor springs 4, yields to this deflection and therefore rotates the sensing mass 5 together with the driving mass about the y-axis or the z-axis.

As can be seen from FIG. 1a) and FIG. 1b), the driving mass 6 oscillates back and forth in the x direction relative to the sensing mass 5. In FIG. 1a) the driving mass 6 is located in its left end position, while in FIG. 1b) it is shown in its right end position. The connecting springs 7 are accordingly bent within the x/y-plane in the x-direction, first to the left and then to the right. The sensing mass 5 does not take part in this driving motion. With regard to the anchor point 3, in the case of the driving motion in the x-direction, an imbalance of the masses arises alternatingly on the left-hand side (FIG. 1a)) and on the right-hand side (FIG. 1b)). If acceleration forces now occur in the y-direction, as illustrated in FIGS. 1a) and 1b), then due to the alternating imbalance, these cause a rotation of the sensing mass 5 and driving mass 6 about the anchor 3 counter-clockwise in FIG. 1a) and clockwise in FIG. 1b). The frequency of this oscillating rotational motion about the z-axis, called the acceleration frequency, corresponds to the frequency of the oscillating driving motion of the driving mass 6. Just as illustrated in FIGS. 1a) and 1b), the sensing mass 5 and the driving mass 6 are alternately rotated in an oscillating manner about the y-axis, when an acceleration of the sensor 1 takes place in the z-direction. Here also an alternating imbalance is present on the left-hand side (−x axis) and on the right-hand side (+x axis). The acceleration in the z direction therefore also causes an oscillation of the sensing mass 5 and driving mass 6 about the y-axis at an acceleration frequency equal to the driving frequency.

In the drawing of FIG. 1, as in the following drawings, the driving device and the sensor device are not shown for reasons of clarity. These can be effected in a conventional manner, for example with fork electrodes, which alternately attract the driving mass 6 and therefore lead to an oscillating back and forth motion of the driving mass 6. Sensing elements can also be, for example, fork electrodes or consist of capacitor plates. Parts of these electrodes or plates are arranged on the substrate 2 in a fixed manner, while other parts are located on the moveable elements, namely the sensing mass 5 and/or the driving mass 6. A deflection of the sensing mass 5 or the driving mass 6 leads to changes in the spacing between the parts arranged on the sensing mass 5, or driving mass 6, and the parts that are fixed on the substrate 2. This change in the spacing can be converted into electrical signals and evaluated.

In FIG. 2a)-i) the response of the sensor 1 during a rotational movement about the z-axis projecting out of the plane of the drawing is shown schematically. The respective torsion is shown with an arrow, rather than with a graphically represented torsion of the sensing mass 5 and driving mass 6, in order to make the mode of action easier to understand. In FIG. 2a) the driving mass 6 is located at its left turning point. The velocity of the driving mass at this position is zero, since it is coming from one direction of motion—in the −x direction— and is subsequently moved into a +x direction. The sensing mass 5 and driving mass 6, in spite of a rotational motion of the sensor 1 about the z-axis, are in this position not subject to a Coriolis force, since the driving velocity of the driving mass 6 is zero. Coriolis forces only arise when the driving mass 6 is in motion. The Coriolis forces are then proportional to the driving motion of the driving mass 6.

In FIG. 2b), at a time t=T/8, the driving mass is moving in the +x direction to the right. The driving mass 6 therefore has a velocity greater than zero, which generates a Coriolis force in the −y direction. The mass 6 in this position is on the −x axis to a greater extent than on the +x-axis, which causes an imbalance to arise and the Coriolis force directed in the −y direction causes a rotation of the sensing mass 5 and driving mass 6 in a counter-clockwise direction.

FIG. 2c) shows the driving element 6 at the time t=T/4. The driving element 6 is located in the equilibrium state with respect to the sensing mass 5. Furthermore, at this position it has an approximately maximum velocity, which causes the Coriolis force at this position to also be a maximum. The Coriolis force is directed in the −y direction, owing to the driving mass 6 and sensing mass 5 being in equilibrium however, no torque is generated. The sensing mass 5 and driving mass 6 accordingly do not rotate. FIG. 2d) shows an imbalance of the masses at time t=3T/8, now with the greater mass on the +x-axis side. The driving velocity of the driving mass 6 is greater than zero, which in turn generates a Coriolis force in the −y direction. The force is unbalanced, which generates a torque on the driving mass 6 and the sensing mass 5 in a clockwise direction. The sensing mass 5 and driving mass 6 rotate accordingly in a clockwise direction about the anchor 3. At time t=T/2—according to FIG. 2e)—the driving mass 6 is in its rightmost position. The driving velocity is again zero, because the driving mass 6 is located at its turning point. Owing to the absence of the driving velocity, no Coriolis force is generated either. The sensing mass 5 and driving mass 6 do not rotate about the z-axis.

In FIG. 2f) the driving mass 6 is moved in the −x-direction. Due to this, a Coriolis force occurs in the +y-direction. The masses are unbalanced, which generates a counter-clockwise rotational movement about the z-axis.

FIG. 2g) shows the driving mass 6 in its central position at time t=3T/4. The driving velocity is essentially a maximum, and hence the Coriolis force is also a maximum. The masses, and therefore the forces, are in equilibrium, which means that in spite of the maximal Coriolis force occurring in the +y-direction, no rotational movement is generated on the sensing mass 5 and the driving mass 6 about the z-axis.

In FIG. 2h)—at time t=7T/8—the driving mass 6 once again has a velocity in the −x-direction, which is greater than zero. Due to the imbalance to the left −x side, a corresponding Coriolis force in the +y-direction generates a rotation of the sensing mass 5 and driving mass 6 clockwise about the z-axis.

FIG. 2i) corresponds again to FIG. 2a at time t=T. The driving mass 6 has completed one period T and is again located at its left-hand turning point. The velocity of the driving mass 6 is zero, which also causes no Coriolis force to occur. The sensing mass 5 and driving mass 6 are located, in spite of their imbalance, in the position illustrated with respect to the x and y-axis. The individual drawings of FIG. 2 reveal that during a period T of the driving mass 6, which has a frequency $f_d=1/T$, the sensing element 5 together with the driving mass 6 experiences a frequency $f_s=2f_d$. In contrast to the acceleration according to FIG. 1, in which the driving frequency $f_d$ is equal to the sensing frequency $f_s$, by evaluation of the frequency $f_s$ it can be established whether the sensor is being linearly accelerated or rotated about an axis. If the sensing frequency $f_s$ is equal to the known driving frequency $f_d$, then an acceleration of the sensor 1 (acceleration frequency) is present, whereas in the case of a sensing frequency $f_s$, which is twice as large as the driving frequency $f_d$, a rotational movement of the sensor 1 (rotation rate frequency) is involved.

In the same way as in FIGS. 2a) to 2i), in which a rotational movement about the z-axis was shown, an evaluation is also possible for a rotational movement of the sensor 1 about the y-axis. Due to the Coriolis force occurring, this causes a rotational movement of the sensing mass 5 and the driving mass 6 about the y-axis. The sensing mass 5 and driving mass 6 therefore pivot out of the plane of the drawing x-y about the y-axis. Corresponding sensing elements detect the respective movements of the frequency $f_s$ about the z-axis or the y-axis and supply corresponding electrical signals, which can be analysed.

FIG. 3 shows another exemplary embodiment of the invention. The sensor 1 is constructed in a very similar way to the sensor 1 of FIGS. 1 and 2. A difference is the arrangement of the connecting springs 7 on the sensing element 5. The connecting springs 7 are arranged at only one point on the sensing element 5. This is intended to illustrate clearly that the actual configuration of the sensing element is only of lesser importance to the principle of operation of the present invention. What is essential is that an imbalance is generated with respect to the mounting, here the anchor 3, which enables a rotational motion of the sensing element 5 and driving element 6 about this mounting, when appropriate Coriolis forces or acceleration forces occur. In FIG. 3a) the driving mass 6 is shown at its left turning point. FIG. 3b) shows the driving mass 6 in its central position and FIG. 3c) at its right turning point. The mode of action and the corresponding responses to accelerations and rotational movements of the sensor 1 correspond to those described as in FIGS. 1 and 2.

FIG. 4 shows another exemplary embodiment of the invention. In this case the driving mass 6 is fixed directly on the anchor 3 by means of anchor springs 4. The anchor springs 4 allows both the mobility of the driving mass 6 in the x direction and a rotation about the y-axis and the z-axis. With respect to a rotation about the x-axis or a displacement in the y or z direction however, the anchor spring 4 is stiff.

The present exemplary embodiment has two sensing elements 5. The sensing elements 5 are arranged on both sides of the y-axis or of the anchor 3. They are connected by means of connecting springs 7 to the driving mass 6. The connecting springs 7 allow a relative mobility of the driving mass 6 in the x direction. This means, in the x-direction the connection springs 7 are constructed to be relatively soft, or with a controlled stiffness or compliance. If the driving mass 6 however is rotated about the z-axis or y-axis owing to acceleration forces or Coriolis forces that occur, and a corresponding imbalance with respect to the anchor 3, then the connecting springs 7 have a corresponding stiffness, so that the sensing masses 5 together with the driving mass 6 are moved in this direction. The sensing masses 5 for their part are fixed on the substrate 2 by means of sensor springs 8 and sensor anchor 9. The sensor springs 8 are configured in such a way that they are stiff in the x direction, but allow mobility of the sensing mass 5 about the y-axis or z-axis respectively.

The principle of operation of the present exemplary embodiment is identical to the principle of the above cited exemplary embodiments. In FIG. 4a)-c) the oscillating motion of the driving mass 6 is shown, FIG. 4a) showing it at its left turning point, FIG. 4b) at its central position and FIG. 4c) at its right turning point. A rotation about the y-axis or z-axis, which in each case extends through the anchor 3, takes place in the same manner as shown in FIGS. 1 and 2. Here too, an imbalance is generated to the left or right of the anchor 3, which causes torques to occur which effect corresponding rotations of the driving mass 6, causing detectable displacements in the sensing masses 5.

FIG. 5 shows a further exemplary embodiment of the present invention which is capable of detecting accelerations in the x, y and z direction, and rotational movements around the x, y or z-axis. For this purpose a sensing mass 5 is connected to two driving masses 6.1 and 6.2. The sensing mass 5 is fixed on the substrate 2 at an anchor 3 that is divided into four, with anchor springs 4. Anchor 3 can naturally also be implemented differently than shown here, for example, it can be divided in two parts or also be implemented as a single part. However care must be taken that the driving mass 6.2 is not prevented from performing a driving motion in the y direction. The sensing mass 5 and driving mass 6.1 along with connecting springs 7.1 correspond essentially to the structure of the embodiment according to FIGS. 1 and 2, and 3. In addition, a further driving mass 6.2 is arranged within the sensing mass 5. This driving mass 6.2 is connected to the sensing mass 5 by means of connecting springs 7.2. The driving mass 6.2 is not driven in the x direction like the driving mass 6.1, but rather in the y direction. The driving mass 6.2 generates a periodically alternating imbalance on the +y and −y-axis. While the sensing mass 5 and the drive element 6.1 respond to accelerations in the y and z directions, and to rotation rates about the y and z-axis, the driving mass 6.2 produces a response to accelerations in the x direction and rotation rates about the x-axis. In doing so, when accelerations occur in the x direction at least the sensing mass 5 and the driving mass 6.2 are rotated at the same frequency as the driving frequency of the driving mass 6.2. When a rotation rate occurs about the x-axis, due to the corresponding imbalances and Coriolis forces, a rotational movement about the z-axis occurs at double the driving frequency of the driving mass 6.2.

FIG. 6 finally shows a further basis drawing of a sensor 1 for detecting accelerations in the x, y and z direction and rotations about the x, y and z-axis. In this arrangement four driving masses 6.1 and 6.2 are arranged around the sensing mass 5. The driving masses 6.1 move in the x direction, while the driving masses 6.2 are driven in the y direction. As described previously, in each case imbalances arise due to this eccentric motion of the driving masses 6.1 and 6.2. The torques generated by this, which in the case of a rotational movement of the sensor 1 are superimposed with Coriolis forces and in the case of accelerations act alone, generate a rotation of the driving masses 6.1 and 6.2 and the sensing mass 5 about the anchor 3 with different frequencies. These different rotation frequencies are evaluated and then indicate a corresponding rotation rate or acceleration. To detect and distinguish the responses from the driving masses 6.1 and 6.2, the driving masses 6.1 and 6.2 can be driven at different frequencies or amplitudes. The corresponding acceleration or rotation rate frequency is then also different.

The invention is not limited to the exemplary embodiments illustrated. Combinations of the illustrated embodiments among themselves, and other arrangements of the sensing masses and driving masses and the shapes of the anchors are possible within the scope of the claims. In the same way, the sensor can also be used solely for displaying a single rotation direction and acceleration direction, if the movements of the sensing masses for the corresponding other directions are suppressed or not measured. List of reference labels.

I claim:

1. A micro-electro-mechanical-system (MEMS) sensor for detecting accelerations along and rotational movements about at least one of three mutually perpendicular spatial axes, x, y, and z, comprising:
   a substrate arranged in an x-y plane;
   at least one driving mass adapted to oscillate in a plane parallel to the substrate and driven in a linear motion along the x-axis;
   at least one sensing mass connected to the least one driving mass via connecting springs, wherein the connecting springs bend to move the at least one sensing mass in a linear motion relative to the at least one driving mass during operation;
   at least one anchor secured to the substrate and at least one anchor spring connected to the at least one driving mass or the at least one sensing mass;
   sensing elements for sensing acceleration, rotation, or both of the MEMS sensor; and
   drive elements for driving the at least one driving mass relative to the at least one sensing mass at a driving frequency,
   wherein the at least one driving mass is adapted to generate an imbalance of the at least one driving mass and the at least one sensing mass with respect to the at least one anchor during operation.

2. A MEMS sensor as recited in claim 1, wherein the at least one driving mass and the at least one sensing mass are adapted to deflect at an acceleration frequency that is equal to the driving frequency when the MEMS sensor is accelerated.

3. A MEMS sensor as recited in claim 1, wherein the at least one driving mass and the at least one sensing mass are adapted to deflect at a rotation frequency that is double the driving frequency when the MEMS sensor is rotated.

4. A MEMS sensor as recited in claim 1, wherein the at least one anchor spring is directly connected to the at least one driving mass and adapted to allow the at least one driving mass to move along the x-axis.

5. A MEMS sensor as recited in claim 4, wherein the at least one anchor spring is adapted to allow at least one driving mass to rotate along the y- and z-axes.

6. A MEMS sensor as recited in claim 1, wherein the at least one anchor is a central anchor.

7. A MEMS sensor as recited in claim 1, wherein the connecting springs are adapted to move along the x-axis only, further comprising:
   sensor springs connected to the at least one driving mass and the at least one sensing mass and adapted to allow the at least one sensing mass to move along y and z axes relative to the at least one driving mass.

8. A MEMS sensor as recited in claim 7, wherein the at least one anchor spring is directly connected to the at least one sensing mass.

9. A MEMS sensor as recited in claim 8, wherein the at least one driving mass includes first and second driving masses and the first driving mass is disposed outside the at least one sensing mass and the second driving mass is dispose inside the at least one sensing mass.

10. A MEMS sensor as recited in claim 9, wherein the first one of the connecting springs is adapted to move along the x-axis and connected to the first driving mass and a second one of the connecting springs is adapted to move along the y-axis and connected to the second driving mass.

11. A MEMS sensor as recited in claim 8, wherein a number of the at least one anchor spring is same as a number of the at least one anchor and wherein each of the at least one anchor spring is connected to a corresponding one of the at least one anchor.

12. A MEMS sensor as recited in claim 8, wherein the at least one driving mass includes four driving masses disposed outside the sensing mass.

13. A MEMS sensor as recited in claim 12, wherein the driving elements drive a first one of the four driving masses at a first driving frequency along the x-axis and a second one of the four driving masses at a second driving frequency along the y-axis.

14. A MEMS sensor as recited in claim 12, wherein the at least one anchor is a central anchor.

15. A MEMS sensor as recited in claim 14, wherein the at least one sensing mass is adapted to rotate and pivot about an axis passing through the central anchor.

16. A MEMS sensor as recited in claim 1, wherein the sensing elements are adapted to measure a movement of the at least one driving mass.

17. A MEMS sensor as recited in claim 1, wherein the sensing elements are adapted to measure a movement of the at least one sensing mass.

18. A MEMS sensor as recited in claim 1, wherein the at least one anchor spring allows the sensing mass to rotate along the z-axis.

19. A MEMS sensor as recited in claim 1, wherein the connecting springs cause the at least one driving mass rigidly coupled to the at least one sensing mass along the y- and t-axes.

* * * * *